(12) United States Patent
Bizen et al.

(10) Patent No.: US 12,505,976 B2
(45) Date of Patent: Dec. 23, 2025

(54) CHARGED PARTICLE BEAM APPARATUS AND METHOD FOR CALCULATING ROUGHNESS INDEX

(71) Applicant: Hitachi High-Tech Corporation, Tokyo (JP)

(72) Inventors: Daisuke Bizen, Tokyo (JP); Kei Sakai, Tokyo (JP); Junichi Kakuta, Tokyo (JP); Masumi Shirai, Tokyo (JP); Minoru Yamazaki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 368 days.

(21) Appl. No.: 17/909,876

(22) PCT Filed: Mar. 30, 2020

(86) PCT No.: PCT/JP2020/014617
§ 371 (c)(1),
(2) Date: Sep. 7, 2022

(87) PCT Pub. No.: WO2021/199183
PCT Pub. Date: Oct. 7, 2021

(65) Prior Publication Data
US 2023/0095456 A1    Mar. 30, 2023

(51) Int. Cl.
*H01J 37/22*    (2006.01)
*G06T 7/13*    (2017.01)
(Continued)

(52) U.S. Cl.
CPC .............. *H01J 37/222* (2013.01); *G06T 7/13* (2017.01); *H01J 37/244* (2013.01); *H01J 37/28* (2013.01);
(Continued)

(58) Field of Classification Search
CPC ........ H01J 37/222; H01J 37/244; H01J 37/28; H01J 2237/24578; H01J 2237/2817;
(Continued)

(56) References Cited

U.S. PATENT DOCUMENTS 5,600,734 A * 2/1997 Okubo ...................... G06T 7/74
382/199
8,304,723 B2 * 11/2012 Agemura ........... G01N 23/2251
250/311

(Continued)

FOREIGN PATENT DOCUMENTS

CN    103155090 A    6/2013
JP    2006-215020 A    8/2006
(Continued)

OTHER PUBLICATIONS

International Search Report, PCT/JP2020/014617, Jun. 2, 2020, 2 pgs.
(Continued)

*Primary Examiner* — David A Vanore
(74) *Attorney, Agent, or Firm* — Volpe Koenig

(57) ABSTRACT

Roughness measurement corrects a machine difference utilizing first PSD data indicating power spectral density of a line pattern measured for a line pattern formed on a wafer for machine difference management by a reference machine in roughness index calculation and second PSD data indicating power spectral density of a line pattern measured for the line pattern formed on the wafer for machine difference management by a correction target machine are used to obtain a correction method for correcting the power spectral density of the second PSD data to the power spectral density of the first PSD data, power spectral density of a line pattern is measured as third PSD data from a scanning image of the line pattern, and corrected power spectral density obtained
(Continued)

by correcting the power spectral density of the third PSD data by the obtained correction method is calculated.

14 Claims, 6 Drawing Sheets

(51) Int. Cl.
    *H01J 37/244* (2006.01)
    *H01J 37/28* (2006.01)
(52) U.S. Cl.
    CPC ............. *G06T 2207/10061* (2013.01); *G06T 2207/30148* (2013.01); *H01J 2237/24578* (2013.01); *H01J 2237/2817* (2013.01)
(58) Field of Classification Search
    CPC ............. H01J 2237/223; G06T 7/13; G06T 2207/10061; G06T 2207/30148; G01N 2223/6116; G01N 2223/634; G01N 23/2251; G01N 2223/401; G01N 2223/418; G03F 7/70625; G03F 7/706847; G01B 15/04
    See application file for complete search history.

(56) References Cited

U.S. PATENT DOCUMENTS

| | | | |
|---|---|---|---|
| 8,822,920 B2* | 9/2014 | Katou | H01J 37/28 250/397 |
| 9,136,089 B2* | 9/2015 | Wang | H01J 37/28 |
| 9,297,649 B2* | 3/2016 | Kawada | G01N 23/00 |
| 9,702,695 B2* | 7/2017 | Kawada | H01J 37/222 |
| 10,176,966 B1* | 1/2019 | Mack | H01J 37/28 |
| 2001/0017878 A1* | 8/2001 | Nozoe | G06T 7/0004 374/7 |
| 2001/0052781 A1* | 12/2001 | Nozoe | H01J 37/222 324/750.03 |
| 2003/0050761 A1* | 3/2003 | Okabe | G01N 21/95607 702/82 |
| 2006/0016990 A1* | 1/2006 | Suzuki | H01J 37/28 250/310 |
| 2006/0043294 A1* | 3/2006 | Yamaguchi | H01J 37/222 250/310 |
| 2006/0071166 A1* | 4/2006 | Sato | H01J 37/28 250/310 |
| 2006/0145076 A1* | 7/2006 | Yamaguchi | G01N 23/2251 250/310 |
| 2006/0243906 A1* | 11/2006 | Fukada | H01J 37/28 250/311 |
| 2007/0023653 A1* | 2/2007 | Toyoda | G06T 7/0006 250/310 |
| 2008/0002195 A1* | 1/2008 | Otani | G01N 21/95607 356/237.3 |
| 2008/0024601 A1* | 1/2008 | Sato | H01J 37/28 250/311 |
| 2008/0319696 A1* | 12/2008 | Tanaka | H01J 37/222 702/97 |
| 2009/0008550 A1* | 1/2009 | Nakano | H01J 37/28 250/310 |
| 2012/0083136 A1* | 4/2012 | Godet | H01L 21/26586 257/E21.328 |
| 2012/0305764 A1* | 12/2012 | Kimura | G01B 15/08 250/307 |
| 2013/0262027 A1* | 10/2013 | Shishido | G01B 21/04 702/155 |
| 2013/0279793 A1* | 10/2013 | Toyoda | G06T 7/001 382/145 |
| 2013/0292568 A1* | 11/2013 | Bizen | H01J 37/244 250/311 |
| 2013/0301954 A1* | 11/2013 | Shirai | H01J 37/28 382/280 |
| 2014/0217274 A1* | 8/2014 | Wang | H01J 37/28 250/252.1 |
| 2015/0212019 A1* | 7/2015 | Shishido | G01N 23/2251 250/307 |
| 2019/0039169 A1* | 2/2019 | Okuma | B23K 26/048 |
| 2019/0066973 A1* | 2/2019 | Kawada | G03F 7/7065 |
| 2019/0204247 A1* | 7/2019 | Yamaguchi | H01L 29/66795 |
| 2023/0094023 A1* | 3/2023 | Hitomi | G01N 23/2251 382/145 |
| 2023/0095456 A1* | 3/2023 | Bizen | G06T 7/13 250/310 |

FOREIGN PATENT DOCUMENTS

| | | |
|---|---|---|
| JP | 2012-151053 A | 8/2012 |
| JP | 2019-039884 A | 3/2019 |
| TW | 201913230 A | 4/2019 |
| WO | 2017/130914 A1 | 8/2017 |

OTHER PUBLICATIONS

Taiwan Office Action, Taiwanese Application No. 110111284, Jan. 3, 2022, 3 pgs.

* cited by examiner

[FIG. 1]
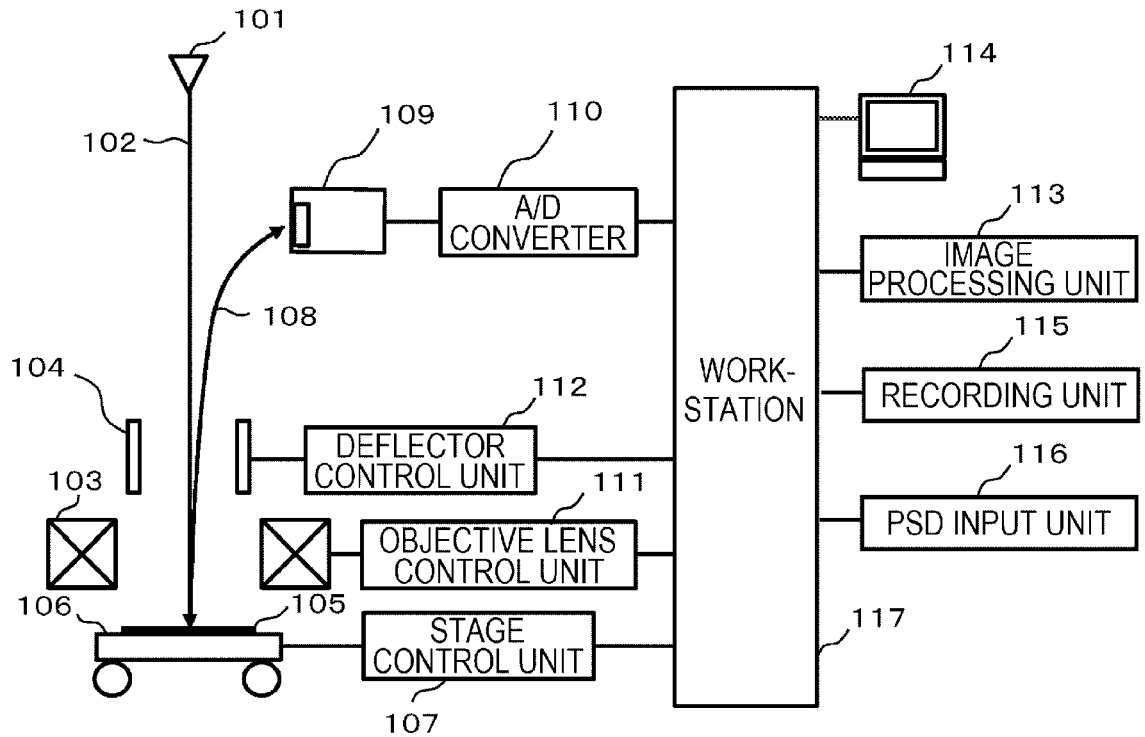
[FIG. 2]
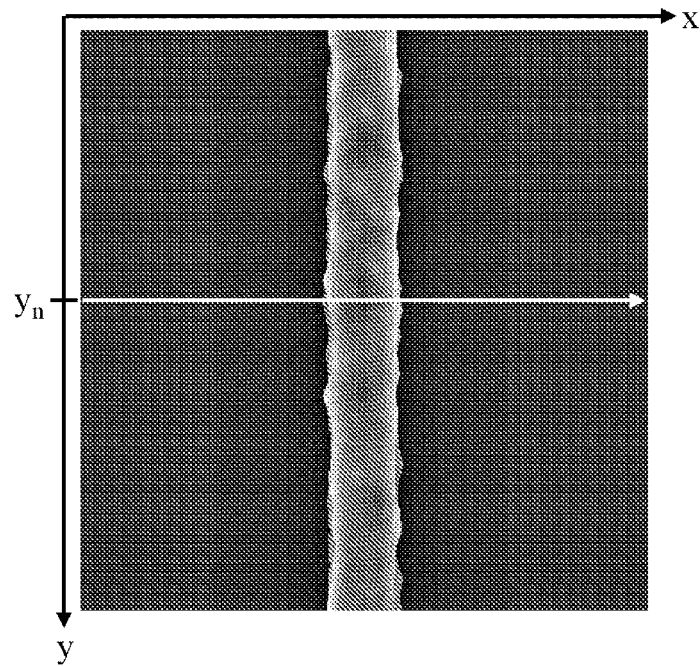

[FIG. 3]
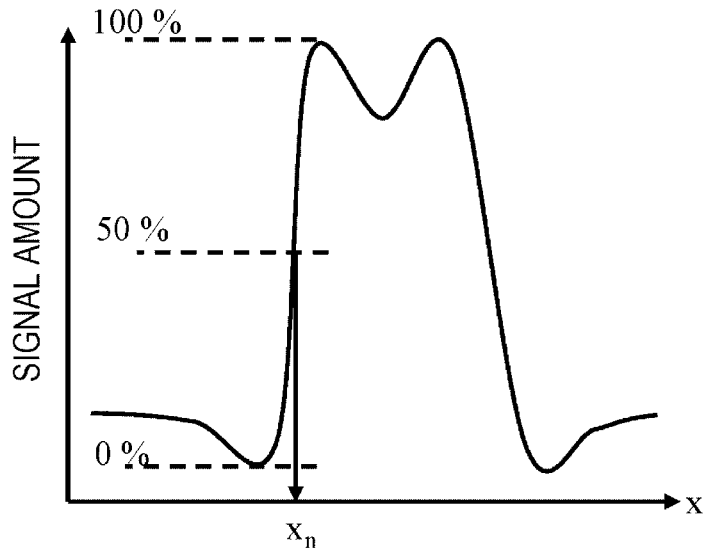
[FIG. 4A]
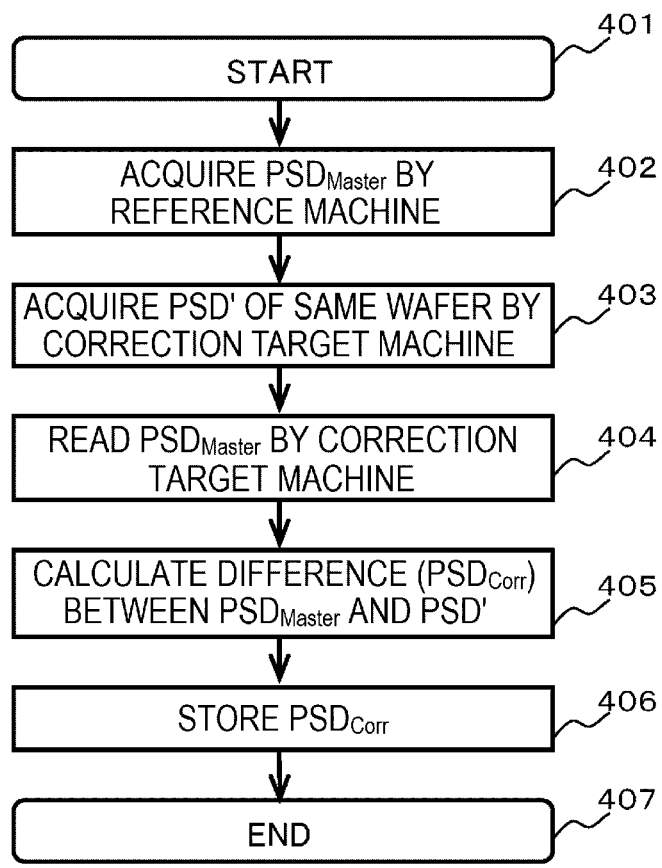

[FIG. 4B]
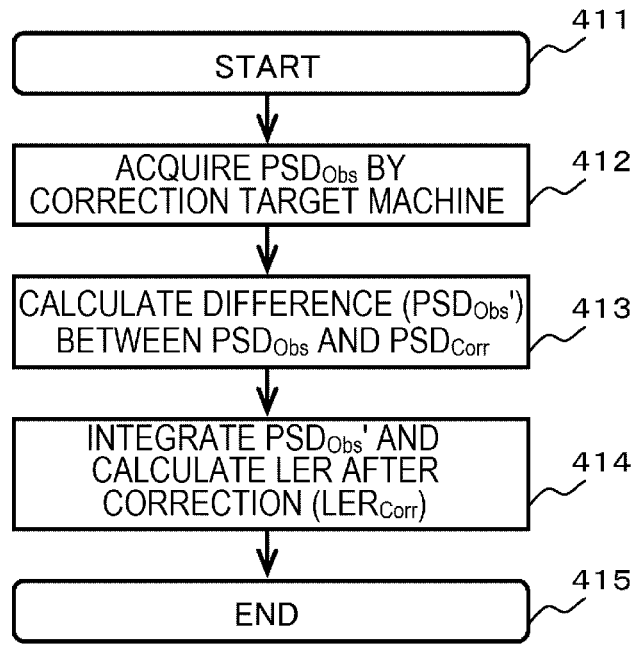
[FIG. 5A]
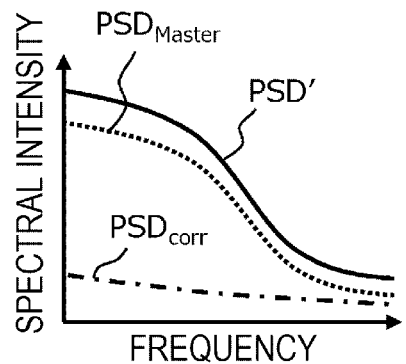

[FIG. 5B]
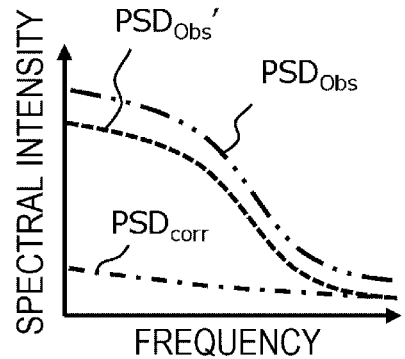
[FIG. 6A]
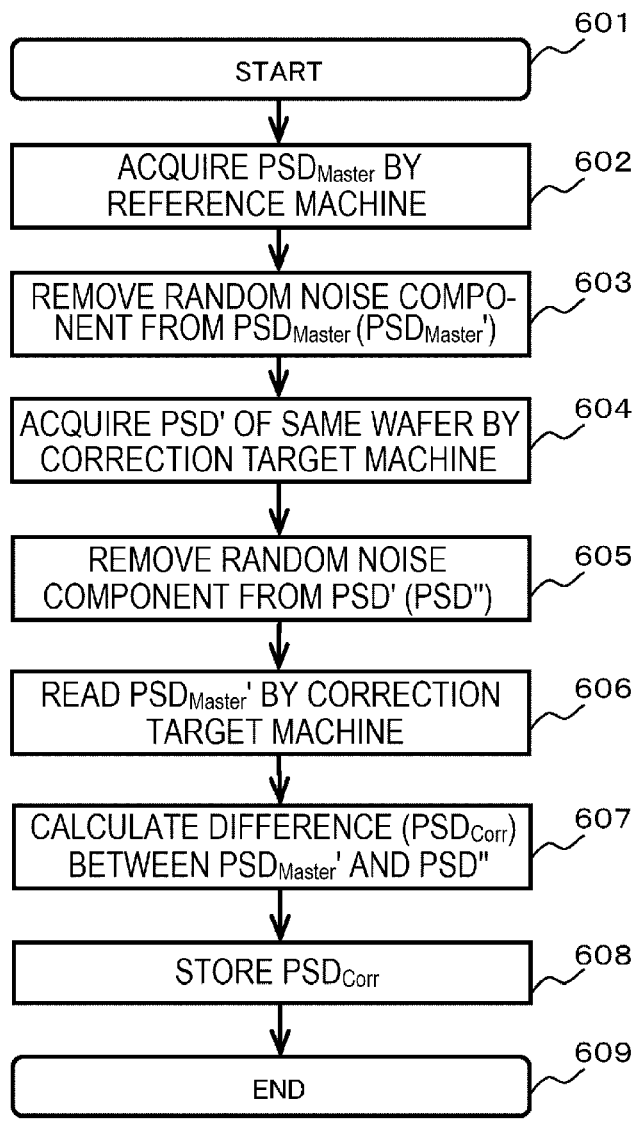

[FIG. 6B]
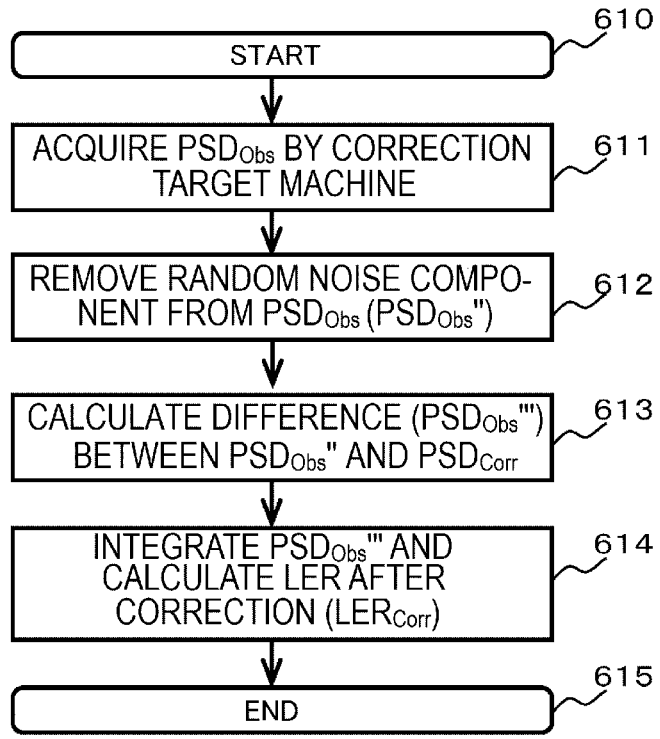
[FIG. 7]
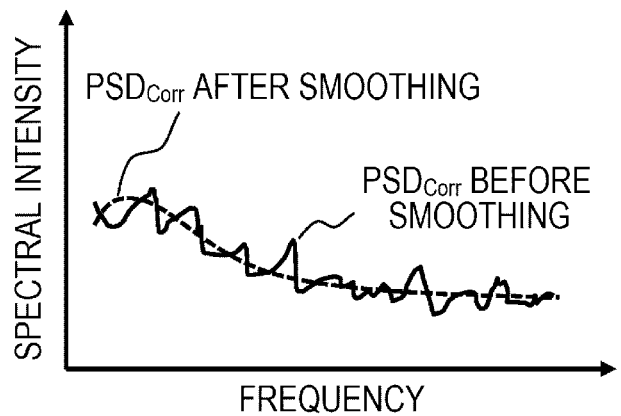
[FIG. 8A]

[FIG. 8B]
[FIG. 9]
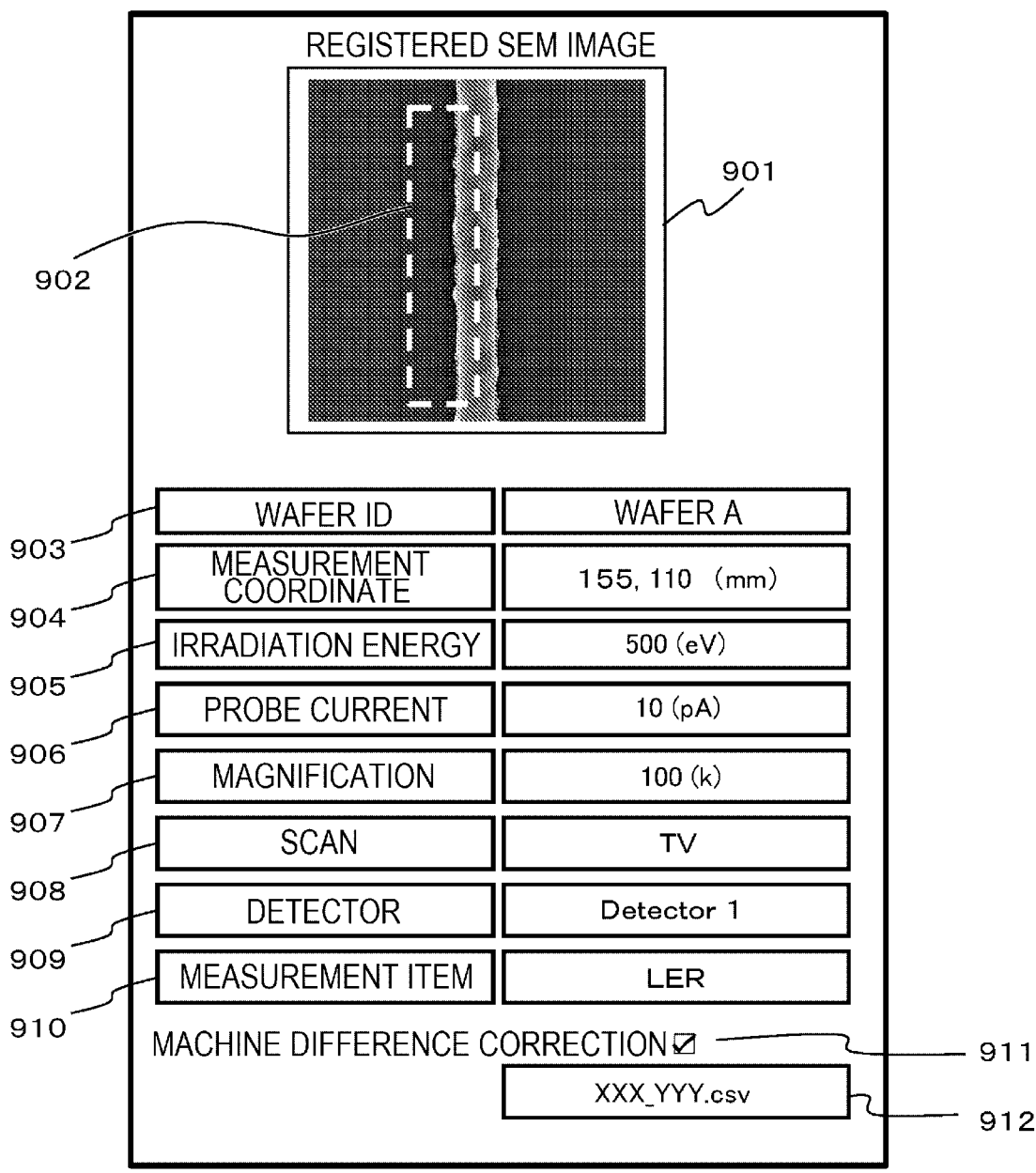

CHARGED PARTICLE BEAM APPARATUS AND METHOD FOR CALCULATING ROUGHNESS INDEX

TECHNICAL FIELD

The present disclosure relates to a charged particle beam apparatus and a method for calculating a roughness index, and in particular, relates to machine difference correction between charged particle beam apparatuses in measurement on a roughness index appearing at an edge of a pattern to be measured.

BACKGROUND ART

In a semiconductor process, in particular, in a lithography process using extreme ultraviolet (EUV) light, edge roughness of a pattern (unevenness of a pattern end) greatly affects a yield of a device along with pattern miniaturization. A degree of generation of the roughness greatly changes depending on properties, features, and the like of a material constituting a semiconductor device, an exposure apparatus, or a base substrate. In particular, in a mass production process, since a magnitude of the roughness greatly affects performance of a product, measurement and management on a roughness index in the mass production process is required.

On the other hand, in a measurement apparatus used in the mass production process, it is important that a difference in measurement value (machine difference) between apparatuses is small. Currently, a scanning electron microscope (SEM) is mainly used for dimension measurement and edge roughness measurement on a semiconductor. Here, in particular, a measurement apparatus used for dimension measurement on a semiconductor is referred to as an SEM type length measurement apparatus. As the importance of the edge roughness measurement in the mass production process of the semiconductor device using the EUV lithography increases, the SEM type length measurement apparatus used for the edge roughness measurement is required to reduce the machine difference in the edge roughness measurement.

CITATION LIST

Patent Literature

PTL 1: JP-A-2019-39884
PTL 2: JP-A-2012-151053

SUMMARY OF INVENTION

Technical Problem

As a factor of the machine difference in the edge roughness measurement using the SEM type length measurement apparatus, noise mixed in an SEM image is considered. PTL 1 discloses a method for removing a noise component of an SEM image by subtracting a power spectral density obtained from one edge position and a power spectral density obtained from the other edge position from a single SEM image in order to remove noise from the SEM image. However, in the method described in PTL 1, it is not possible to remove noise components unique to the apparatus, for example, vibration of a column and power supply noise, which are equally mixed in one edge position and the other edge position.

On the other hand, PTL 2 describes a method for removing noise unique to an apparatus by obtaining a noise frequency and a noise amplitude unique to the apparatus from an SEM image obtained when an electron beam is deflected only in one direction and feeding back the noise frequency and the noise amplitude to a deflector for scanning the electron beam. However, in the method described in PTL 2, since a phase is not known even when an amplitude of a signal to be fed back to the deflector is known, there is a problem that trial and error are required to identify an optimum phase.

Hereinafter, a charged particle beam apparatus and a method for calculating a roughness index capable of correcting a machine difference between apparatuses when measuring a roughness index of a pattern using a charged particle beam apparatus that is represented by an SEM type length measurement apparatus and that performs scanning with a charged particle beam in a specific direction are proposed.

Solution to Problem

A charged particle beam apparatus as an aspect of the present invention includes: a charged particle beam optical system configured to two-dimensionally scan a line pattern formed on a sample with a charged particle beam; a detector configured to detect electrons emitted from the sample by being irradiated with the charged particle beam; an image processing unit configured to calculate a roughness index of the line pattern formed on the sample from a scanning image obtained from a signal detected by the detector; and a power spectral density input unit configured to input first PSD data indicating power spectral density of a line pattern measured for a line pattern formed on a first wafer in advance by a reference charged particle beam apparatus serving as a reference of machine difference management in calculating the roughness index.

The image processing unit is configured to measure, as second PSD data, power spectral density of the line pattern formed on the first wafer from a scanning image of the line pattern formed on the first wafer, obtain a correction method for correcting the power spectral density of the second PSD data to the power spectral density of the first PSD data, measure, as third PSD data, power spectral density of a line pattern formed on a second wafer from a scanning image of the line pattern formed on the second wafer, calculate corrected power spectral density obtained by correcting the power spectral density of the third PSD data by the correction method, and calculate a roughness index of the line pattern formed on the second wafer using the corrected power spectral density.

Advantageous Effects of Invention

Roughness measurement in which a machine difference is corrected is implemented.

Other problems and novel features will become apparent from the descriptions of the present description and the accompanying drawings.

BRIEF DESCRIPTION OF DRAWINGS

FIG. 1 is a schematic configuration diagram of an SEM type length measurement apparatus.

FIG. 2 is a schematic view of a scanning image acquired by the SEM type length measurement apparatus.

FIG. 3 is a diagram illustrating a method for determining an edge position.

FIG. 4A is a flowchart of a method for correcting a machine difference of a LER measurement value.

FIG. 4B is a flowchart of the method for correcting a machine difference of a LER measurement value.

FIG. 5A is a schematic view of PSD used for LER measurement.

FIG. 5B is a schematic view of PSD used for LER measurement.

FIG. 6A is a flowchart of a method for correcting a machine difference of a LER measurement value.

FIG. 6B is a flowchart of the method for correcting a machine difference of a LER measurement value.

FIG. 7 is a diagram illustrating a method for increasing an accuracy of a correction function.

FIG. 8A is a diagram illustrating a method for correcting a machine difference of a roughness index using machine learning.

FIG. 8B is a diagram illustrating the method for correcting a machine difference of a roughness index using machine learning.

FIG. 9 is a diagram showing an example of a GUI.

DESCRIPTION OF EMBODIMENTS

Hereinafter, embodiments of the invention will be described. Although the drawings shown in the present embodiments show specific embodiments according to the principle of the invention, the drawings are for the purpose of understanding the invention, and are not to be used for limiting interpretation of the invention. In the following embodiments, although an SEM type length measurement apparatus using electrons as a charged particle source will be described as an example, the same effect can be obtained even when various ions are used as a charged particle source.

First Embodiment

FIG. 1 shows a configuration of an SEM type length measurement apparatus. The SEM type length measurement apparatus includes, as main configurations, an electron beam optical system that irradiates a sample with an electron beam, a detection system that detects secondary electrons emitted from the sample due to irradiation with the electron beam, a stage mechanism system disposed in a vacuum chamber (not shown), a control system that controls components of the SEM type length measurement apparatus and processes various kinds of information, and an image processing system that measures dimensions and edge roughness of a pattern from an obtained SEM image.

Specifically, primary electrons 102 generated by an electron source 101 are deflected by a deflector 104 and are focused by an objective lens 103, and then a sample 105 mounted on a movable stage 106 is irradiated with the primary electrons 102. An operation of the objective lens 103 is controlled by an objective lens control unit 111, an operation of the deflector 104 is controlled by a deflector control unit 112, and an operation of the movable stage 106 is controlled by a stage control unit 107. A negative voltage may be applied to the sample 105 via the movable stage 106.

Secondary electrons 108 generated by the irradiation on the sample 105 with the primary electrons 102 by the electron beam optical system as described above are detected by a detector 109 constituting a detection system. In the shown example, the detector 109 is disposed closer to the electron source 101 than the deflector 104. Alternatively, the detector 109 may be disposed between the deflector 104 and the objective lens 103 or between the objective lens 103 and the sample 105 as long as the detector 109 can detect the secondary electrons 108. Examples of the configuration of the detector 109 include an Everhart-Thornley (E-T) detector and a semiconductor detector which are configured with a scintillator, a light guide, and a photomultiplier tube. Alternatively, any detector may be used as long as it is a configuration capable of detecting electrons. Further, the detector 109 may be mounted at a plurality of positions. A signal detected by the detector 109 is converted into a digital signal by an A/D converter 110. A signal for each electron beam coordinate is generated by an image processing unit 113, a scanning image is displayed on a display unit 114, and the scanning image is also recorded in a recording unit 115.

Operations of the stage control unit 107, the A/D converter 110, the objective lens control unit 111, the deflector control unit 112, the image processing unit 113, the display unit 114, the recording unit 115, and a PSD input unit 116 to be described later are controlled by a workstation 117.

FIG. 2 shows a schematic view of the scanning image obtained by the SEM type length measurement apparatus shown in FIG. 1. A fluctuation amount of an edge position in a line pattern in FIG. 2 is a line edge roughness (LER). A method for measuring the LER will be described. In FIG. 2, a line profile in an x direction at a y coordinate $y_n$ is shown in FIG. 3. When an edge on a left side of the line pattern is determined, a minimum signal amount on a left side of the line profile is set to 0%, a maximum signal amount is set to 100%, and an x coordinate at which the signal amount is 50% is determined as an edge position $x_n$ at the y coordinate $y_n$. This determination method is called a threshold method. An x coordinate at which the signal amount is other than 50% may be defined as the edge position $x_n$. In addition, a method other than the threshold method, for example, a differential value of the line profile may be used, or an edge position may be obtained by matching with a waveform obtained in advance. By performing Fourier analysis on the edge position $x_n$ obtained by a plurality of y coordinates $y_n$, a power spectrum density (hereinafter, referred to as "PSD") is obtained. In general, the LER is expressed as an integration with respect to a frequency of the PSD. The calculation on the edge position, the PSD analysis, and the calculation on the LER can be performed by the image processing unit 113, and results are displayed on the display unit 114 and are recorded in the recording unit 115.

The acquired PSD (or LER) varies in a wafer plane. Therefore, for example, several hundred measurement points are provided on a wafer, and PSD measured for line patterns of the measurement points is averaged to obtain PSD of the wafer.

In the acquired PSD, a change in the edge position of the pattern to be observed and a change in the edge position caused by noise unique to the apparatus are superimposed on each other. Since noise unique to the apparatus has a machine difference, it is necessary to remove a machine difference component of the noise from the PSD in order to reduce the machine difference in LER measurement. FIGS. 4A and 4B show a specific flow for obtaining a LER value obtained by correcting the machine difference component of noise from the PSD.

The flow is divided into a step of creating a correction function shown in FIG. 4A and a step of executing correction shown in FIG. 4B. First, the flow of creating a correction function shown in FIG. 4A will be described. First, PSD ("$PSD_{Master}$") of a pattern formed on a wafer used for machine difference management in an apparatus serving as a reference for machine difference management (referred to as a "reference machine") is acquired (402). Here, $PSD_{Master}$ may be obtained from one apparatus, or may be obtained from a plurality of apparatuses as an average value of PSD acquired in a pattern used for machine difference management. The $PSD_{Master}$ is recorded in the recording unit 115.

Next, PSD' is acquired using the same wafer as when obtaining the $PSD_{Master}$, by an apparatus to be subjected to the machine difference correction on the LER measurement value (referred to as a "correction target machine") (403). The wafer used for the measurement on the PSD' may not be the same as the wafer for obtaining the $PSD_{Master}$, and if there are a plurality of wafers confirmed to have the same LER as the wafer for obtaining the $PSD_{Master}$, the measurement may be performed using one of the wafers. Next, the $PSD_{Master}$ is read by the correction target machine (404). The $PSD_{Master}$ can be input from the PSD input unit 116. Subsequently, as shown in (Equation 1), a difference between the PSD' and the $PSD_{Master}$ is calculated and is defined as a correction function $PSD_{Corr}$ (405).

$$PSD_{Corr}=PSD'-PSD_{Master} \quad \text{(Equation 1)}$$

Finally, the correction function $PSD_{Corr}$ is recorded in the recording unit 115 (406).

The flow for executing the correction shown in FIG. 4B will be described. In the flow for executing the correction, PSD ($PSD_{Obs}$) of a pattern formed on any wafer is measured by the apparatus to be subjected to the machine difference correction on the LER measurement value (referred to as the "correction target machine") (412). Using the correction function $PSD_{Corr}$ recorded in the recording unit 115, a difference $PSD_{Obs}$' between the $PSD_{Obs}$ and the $PSD_{Corr}$ is calculated as shown in (Equation 2) (413).

$$PSD_{Obs}'=PSD_{Obs}-PSD_{Corr} \quad \text{(Equation 2)}$$

Next, a LER ($LER_{Corr}$) obtained after the machine difference correction is calculated by integrating $PSD_{Obs}$' with respect to the frequency (414). The calculated $LER_{Corr}$ is displayed on the display unit 114 and is recorded in the recording unit 115.

A relation among the $PSD_{Corr}$, the PSD', and the $PSD_{Master}$ in FIG. 4A is shown in FIG. 5A, and a relation among the $PSD_{Obs}$', the $PSD_{Obs}$, and the $PSD_{Corr}$ in FIG. 4B is shown in FIG. 5B. The PSD' and the $PSD_{Master}$ are acquired from the same wafer (or a wafer having a LER of the same magnitude), and the PSD of the pattern itself is the same. Therefore, the $PSD_{Corr}$, which is the difference between the PSD' and the $PSD_{Master}$ represents a difference in noise between the reference machine and the correction target machine. Accordingly, by subtracting the $PSD_{Corr}$ from the $PSD_{Obs}$ obtained in any pattern in the correction target machine, the $PSD_{Obs}$' with the machine difference component of noise being removed is obtained.

Second Embodiment

The PSD obtained by an SEM type length measurement apparatus includes both a roughness component and a noise component of a pattern itself. Further, the noise component included in the PSD includes a noise component (random noise component) having a constant intensity at any frequency, and a method for removing the random noise component from the PSD is known (for example, PTL 1). A second embodiment discloses a method for obtaining the correction function $PSD_{Corr}$ for machine difference correction from the PSD after random noise removal.

Flows according to the present embodiment are shown in FIGS. 6A and 6B. A basic flow is the same as that of FIGS. 4A and 4B. After the PSD ($PSD_{Master}$) of a pattern formed on a wafer used for machine difference management is acquired (602) by a reference machine, the PSD ($PSD_{Master}$') is obtained by removing the random noise component from the $PSD_{Master}$ (603). Similarly, in the correction target machine, the PSD' is also measured using the same wafer as when obtaining the $PSD_{Master}$ (604), and then PSD (PSD") is obtained by removing the random noise component from the PSD' (605). Then, the $PSD_{Master}$' is read by the correction target machine (606), and the correction function $PSD_{Corr}$ defined by (Equation 3) is obtained from the $PSD_{Master}$' and the PSD" (607).

$$PSD_{Corr}=PSD''-PSD_{Master}' \quad \text{(Equation 3)}$$

Finally, the correction function $PSD_{Corr}$ is recorded in the recording unit 115 (608).

The flow for executing the correction shown in FIG. 6B will be described. After the PSD ($PSD_{Obs}$) of any wafer is acquired by the correction target machine (611), the PSD ($PSD_{Obs}$") with a random noise component being removed is obtained (612). Then, the PSD ($PSD_{Obs}$''') is obtained by subtracting the $PSD_{Corr}$ from the $PSD_{Obs}$" (613), and a LER ($LER_{Corr}$) obtained after the machine difference correction is calculated by integrating the $PSD_{Obs}$''' with respect to the frequency (614).

In this way, in the second embodiment, it is possible to obtain the PSD in which the remaining machine difference component of the noise is corrected with respect to the PSD from which the random noise is removed.

Whether to use the method according to the first embodiment or the method according to the second embodiment may be selected according to the operation of the mass production process. When the process control is performed by the LER calculated from the PSD from which random noise independent of the frequency is removed, it is desirable to use the method according to the second embodiment, and when the process control is performed by the LER calculated from the PSD from which random noise is not removed, it is desirable to use the first embodiment. Accordingly, it is possible to manage the mass production process by a management numerical value with a reduced machine difference while maintaining the continuity of the management numerical value.

Hereinafter, a modification of the method for correcting the machine difference component described in the first embodiment or the second embodiment will be described. First, a method for obtaining the correction function $PSD_{Corr}$ with higher accuracy will be disclosed. In the correction function $PSD_{Corr}$ obtained in the first embodiment and the second embodiment, finite noise is superimposed due to measurement variation according to the number of edges used for PSD analysis. The noise affects the machine difference correction accuracy of the PSD. Therefore, as shown in FIG. 7, the correction function $PSD_{Corr}$ can be determined with high accuracy by performing smoothing processing on the correction function $PSD_{Corr}$ calculated by (Equation 1) or (Equation 3). As a smoothing method, a moving average may be used, or approximation may be performed by any function.

In the first embodiment and the second embodiment, the correction function $PSD_{Corr}$ is defined by a difference as in (Equation 1) or (Equation 3). Alternatively, the correction function $PSD_{Corr}$ may be defined by another method. For example, (Equation 4-1) defines the correction function $PSD_{Corr}$ by a ratio of the $PSD_{Master}$ to the PSD' in the first embodiment.

$$PSD_{Corr}=PSD_{Master}/PSD' \quad \text{(Equation 4-1)}$$

In this case, the $PSD_{Obs}'$ after machine difference correction on any wafer can be calculated by (Equation 5-1).

$$PSD_{Obs}' = PSD_{Corr} \times PSD_{Obs} \quad \text{(Equation 5-1)}$$

In the case of the second embodiment, corresponding calculation is performed by the following.

$$PSD_{Corr} = PSD_{Master}'/PSD'' \quad \text{(Equation 4-2)}$$

$$PSD_{Obs}''' = PSD_{Corr} \times PSD_{Obs}'' \quad \text{(Equation 5-2)}$$

Furthermore, the method for correcting a machine difference is not limited to the correction method using a function as described above, and may be a correction method using machine learning. A method for obtaining the $PSD_{Obs}'$ and the $PSD_{Obs}'''$ after machine difference correction on any wafer using machine learning will be described with reference to FIGS. 8A and 8B. FIG. 8A shows steps of learning, and FIG. 8B shows steps of machine difference correction using a learned model. The type of machine learning is supervised learning, and as shown in FIG. 8A, learning is performed such that the PSD' or the PSD'' of a pattern formed on a wafer used for machine difference management, which is acquired in a correction target machine, is input, and the $PSD_{Master}$ or the $PSD_{Master}'$ of a pattern of the same wafer, which is acquired in a reference machine, is output. Here, as an example of a learning algorithm, a deep neural network, convolutional neural networks, generative adversarial networks, and the like can be used. In addition, any algorithm that can estimate the $PSD_{Master}$ or the $PSD_{Master}'$ from the PSD' or the PSD'' can be applied. In the steps of machine difference correction, as shown in FIG. 8B, by inputting the $PSD_{Obs}$ or the $PSD_{Obs}''$ acquired on any wafer in the correction target machine to a learned model, the $PSD_{Obs}'$ or the $PSD_{Obs}'''$ subjected to machine difference correction is output.

The method for correcting a machine difference in the LER measurement described above is preferably set for each of optical conditions for acquiring an SEM image used for the LER measurement, specifically, an irradiation energy of the primary electrons 102 on the sample 105, a current amount of the primary electrons 102, a type of the detector 109 used for acquiring the SEM image, and a scanning speed at which the scanning is performed with the primary electrons 102 on the sample 105. The reason is that when the optical conditions change, the amount of noise superimposed on the SEM image changes.

FIG. 9 shows an example of a GUI displayed on the display unit 114 by the PSD input unit 116. A display area 901 of the SEM image used for measurement is shown at the top of a GUI screen, and a wafer ID 903 indicating a wafer to be measured, a measurement coordinate 904 indicating a measurement position, an irradiation energy 905 as an optical condition, a probe current 906, a magnification 907, a scanning method 908, a detector type 909, and a measurement item 910 can be specified. In the example of the drawing, a region corresponding to the specified measurement coordinate is displayed on the SEM image (902). Here, when the LER is selected as the measurement item 910, a machine difference correction check box 911 is activated. When the machine difference correction check box 911 is checked, the $PSD_{Master}$ or the $PSD_{Master}'$ can be input. In this example, the data of the $PSD_{Master}$ or the $PSD_{Master}'$ corresponding to the optical condition is specified in the box 912.

This example shows an example in which an operator specifies the data of the $PSD_{Master}$ or the $PSD_{Master}'$ by the GUI displayed on the display unit 114 by the PSD input unit 116. Alternatively, it is also possible to connect the reference machine and the correction target machine by a network and to input the data of the $PSD_{Master}$ or the $PSD_{Master}'$ corresponding to a predetermined optical condition to the correction target machine via the network.

The invention is not limited to the LER measurement described above, and can be applied to measurement on other roughness indices of a line pattern, specifically, line width roughness (LWR). In this case, in FIG. 2, the line width $CD_n$ at the y coordinate $y_n$ is measured, a result of performing Fourier analysis on the line width $CD_n$ obtained by a plurality of $y_n$ is set as the PSD, and the LWR subjected to machine difference correction can be obtained by applying the method according to the embodiments or the modification described above.

REFERENCE SIGNS LIST

101: electron source
102: primary electron
103: objective lens
104: deflector
105: sample
106: movable stage
107: stage control unit
108: secondary electron
109: detector
110: A/D converter
111: objective lens control unit
112: deflector control unit
113: image processing unit
114: display unit
115: recording unit
116: PSD input unit
117: workstation

The invention claimed is:

1. A method implemented by a scanning electron microscope (SEM) type length measurement apparatus comprising an objective lens, a deflector, a detector, an analog-to-digital (A/D) converter, an image processing unit, and a power spectral density (PSD) input unit for decreasing variation in roughness measurements made by SEMs in semiconductor fabrication, the method comprising:
  receiving, by the PSD input unit, a first power spectral density (PSD) that indicates a power spectral density of a line pattern measured for a line pattern formed on a first wafer in advance by a second SEM;
  acquiring, by a first SEM under a specified optical condition including at least one of irradiation energy, probe current, detector type, or scanning speed, a scanning image of the line pattern formed on the first wafer by two-dimensionally scanning the line pattern with a charged particle beam, detecting electrons emitted from the line pattern with the detector, and converting a detection signal into a digital image via the A/D converter;
  determining a second PSD that indicates a power spectral density of the line pattern formed on the first wafer from the acquired scanning image by the first SEM;
  obtaining a correction method for correcting the power spectral density of the second PSD to the power spectral density of the first PSD;
  acquiring, by the first SEM under the same specified optical condition, a scanning image of a line pattern formed on a second wafer by two-dimensionally scanning the line pattern with the charged particle beam, detecting electrons emitted from the line pattern with the detector, and converting the detection signal into a digital image via the A/D converter;

determining a third PSD that indicates a power spectral density of a line pattern formed on the second wafer from the acquired scanning image by the first SEM;

calculating a corrected power spectral density obtained by correcting the power spectral density of the third PSD by the correction method; and calculating a roughness index of the line pattern formed on the second wafer by the first SEM using the corrected power spectral density, wherein the roughness index comprises at least one of a line edge roughness (LER) or a line width roughness (LWR).

2. The method according to claim 1, wherein the first wafer is one of a plurality of wafers, and power spectral density of line patterns respectively formed on the plurality of wafers is the same.

3. The method according to claim 1, wherein the first PSD and the second PSD are average values of power spectral density of line patterns measured for a plurality of line patterns formed on the first wafer.

4. The method according to claim 1, wherein the first PSD is an average value of power spectral density of a line pattern measured for the line pattern formed on the first wafer by a plurality of reference charged particle beam apparatuses.

5. The method according to claim 1, wherein an edge position of the line pattern formed on the second wafer is measured, and the LER is calculated as the roughness index of the line pattern formed on the second wafer, or a line width of the line pattern formed on the second wafer is measured, and the LWR is calculated as the roughness index of the line pattern formed on the second wafer.

6. The method according to claim 1, wherein as the correction method, a difference between the power spectral density of the second PSD and the power spectral density of the first PSD is obtained, and the power spectral density of the third PSD is corrected based on the difference.

7. The method according to claim 6, wherein the difference is smoothed to form a smoothed difference, and the power spectral density of the third PSD is corrected based on the smoothed difference.

8. The method according to claim 1, wherein as the correction method, a ratio between the power spectral density of the second PSD and the power spectral density of the first PSD is obtained, and the power spectral density of the third PSD is corrected based on the ratio.

9. The method according to claim 8, wherein the ratio is smoothed to form a smoothed ratio, and the power spectral density of the third PSD is corrected based on the smoothed ratio.

10. The method according to claim 1, wherein as the correction method, a model to which the power spectral density of the second PSD is input and from which the power spectral density of the first PSD is output is learned, and the power spectral density of the third PSD is input to a learned model, thereby correcting the power spectral density of the third PSD.

11. The method of claim 1, wherein the first PSD corresponds to the specified optical condition used by the first SEM during the acquiring.

12. The method of claim 1, wherein a random-noise component independent of frequency is removed from the first, second, and third PSDs prior to obtaining the correction method and calculating the corrected power spectral density.

13. The method of claim 1, wherein the correction method comprises smoothing a difference or a ratio between the second PSD and the first PSD and applying the smoothed result to the third PSD.

14. The method of claim 1, wherein the correction method comprises a supervised machine-learning model trained to output the first PSD from the second PSD, and the third PSD is input to the trained model to produce the corrected power spectral density.

* * * * *